United States Patent Office
2,732,351
Patented Jan. 24, 1956

2,732,351

N-ALKYLATED COPOLYMERS OF VINYL PYRIDINE AND POLYVINYL AROMATIC COMPOUNDS AND THE PRODUCT OBTAINED THEREBY

John T. Clarke, Newton Highlands, Mass., assignor to Ionics, Incorporated, Cambridge, Mass., a corporation of Massachusetts No Drawing. Application January 22, 1953,
Serial No. 332,745

12 Claims. (Cl. 260—2.1)

This invention relates to synthetic organic anion exchange materials comprising N-alkylated copolymers of a vinyl pyridine compound and a polyvinyl aromatic compound, and has for its primary object the preparation from such materials of selectively permeable and electrically conductive solid structures of controlled geometry and dimensions.

The structures of this invention are solid solvated gels which have as a skeletal structure an insoluble infusible polymeric matrix that includes dissociable vinyl pyridinium salt groups of the structure

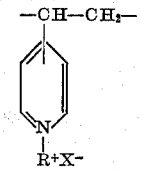

where R is an alkyl group and X is an anion. The dissociable salt groups distributed throughout the matrix impart to the structures a fixed cationic charge electrostatically associated with a mobile replaceable anion. These materials thus exhibit anion exchange characteristics and in addition are selectively permeable and electrically conductive.

In addition to the electrical properties, the materials of this invention are mechanically durable and substantially hydraulically impermeable, and may thus be formed into self-sustaining structures which are useful as hydraulic separators, particularly in the field of electrodialysis, for instance in the processes and apparatus disclosed in the following copending applications: Walter Juda and Wayne A. McRae, Ser. No. 146,706 filed February 28, 1950, now Pat. No. 2,636,851, issued April 28, 1953; Walter Juda and Wayne A. McRae, Ser. No. 207,289 filed January 23, 1951; Davis R. Dewey II and Edwin R. Gilliland, Ser. No. 213,514 filed March 2, 1951; and William E. Katz and Norman W. Rosenberg, Ser. No. 300,302 filed July 22, 1952.

A particularly desirable characteristic of the copolymeric structures of this invention is that unlike most ion exchange resins they do not change significantly in volume when the concentration of the solution with which they are associated is changed.

In general, the process of the present invention consists first in forming a solid solvated gel structure which is coherent, homogeneous and of controlled geometry and dimensions and which comprises as its matrix a cross linked copolymer of a vinyl pyridine compound and a polyvinyl aromatic compound. The gel structure is then reacted with an alkylating agent to convert the pyridine groups to pyridinium salt groups.

The solid gel structure is formed by combining a mono vinyl pyridine compound, that is a compound having the representative structure

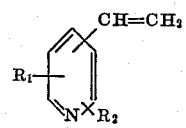

where $R_1$ and/or $R_2$ are hydrogen or an alkyl group (including 2-vinyl pyridine; 3-vinyl pyridine; 4-vinyl pyridine; 2-vinyl 5 ethyl pyridine; 2 methyl 5 vinyl pyridine; 2 vinyl 6 methyl pyridine; 2 methyl 4 vinyl pyridine; 2 vinyl 4, 6, dimethyl pyridine; and other vinyl compounds containing the pyridine nucleus such as 2 vinyl quinoline, etc., all of which are referred to generally herein as vinyl pyridine compounds) and a polyvinyl aromatic compound, that is a compound having an aromatic nucleus to which are joined two or more $-C=CH_2$ groups (including divinyl benzene, di-isopropenyl benzene, divinyl naphthelene, etc. and if desired, a monovinyl aromatic compound (such as styrene, ethyl vinyl benzene or alpha methyl styrene) in a suitable solvent, disposing the solution to the desired form, and effecting copolymerization under conditions preventive of the evaporation of solvent. The polymerization thus proceeds in solution to form an insoluble infusible cross-linked matrix that uniformly permeates the mass of solution and occludes the solvent as the liquid phase of a coherent homogeneous gel. The polymeric matrix is thus formed to accommodate the liquid phase and is not swollen by it resulting in a highly solvated gel having an unstressed matrix. The prevention of the escape of solvent during polymerization is an important feature of this invention, as it is necessary for the formation of a continuous gel free of fractures.

The polymerizing ingredients are preferably combined in the following proportions:

| | mols |
|---|---|
| Polyvinyl aromatic compound | 1 |
| Vinyl pyridine compound | 1–3 |
| Monovinyl aromatic compound | 0–1 | along with a catalyst for the polymerization such as 2 azo-bis-isobutyronitrile or benzoyl peroxide, in between 20 and 70, and preferably about 50, per cent solvent, by volume based on the total volume. Suitable solvents include toluene, benzene, ketones, aliphatic hydrocarbons and other solvents in which the reactants may be dissolved and which do not themselves polymerize.

In forming membranes, the polymeric gel may advantageously be formed on a reinforcing web of paper, felt, fabrics or the like, by placing the web on a flat casting surface, pouring the solution over it, then covering the cast and heating the solution until polymerization is complete.

After the gel is formed it is removed from the casting surface or mold and alkylated in a solution of an alkylating or aralkyl agent. The alkylation of the gel accordingly is effected under conditions substantially preventive of the escape of the solvent in said gel. Suitable alkylating agents include alkyl halides such as methyl bromide, ethyl iodide, benzyl chloride, etc.; alkyl sulfates such as dimethyl sulfate, diethyl sulfate, dilauryl sulfate, etc.; and alkyl aryl sulfonates such as methylbenzene sulfonate. Alkylation in this manner converts the vinyl pyridine compound to an alkyl vinyl pyridinium salt according to the general reaction:

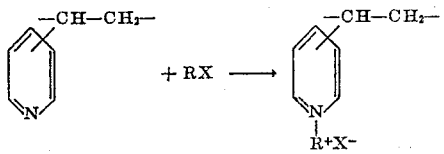

After the gel has been alkylated it may be leached in water to convert it to an aqueous gel and to remove adsorbed unused reactants. It may thereafter be converted to other salt forms by leaching it in a solution of the desired anions to replace the anions with which it was formed with other anions, such as chloride, nitrate or hydroxide.

The following example describes in detail the best manner now known of practicing this invention. The preferred vinyl pyridine compounds are 2 vinyl pyridine or 4 vinyl pyridine and the preferred polyvinyl aromatic compound is divinyl benzene. The preferred alkylating agent is dimethyl sulfate.

*Example*

| | |
|---|---|
| 2-vinylpyridine | cc__ 108 |
| Divinylbenzene, commercial 76% | cc__ 80 |
| Toluene | cc__ 125 |
| 2-azobisisobutyronitrile | g__ 0.6 |

The vinylpyridine was freshly distilled. The commercial divinylbenzene contained 75 mol per cent of divinylbenzene, 24 mol per cent of ethylvinylbenzene and 1 mol per cent of diethylbenzene. The ingredients were mixed and cast onto a glass paper surfacing mat 0.8 mm. thick between two glass plates. The cast was baked at 80° C. for three hours and then removed from the mold. During polymerization, evaporation of solvent into the space between the plates beyond the area occupied by the cast occurred only at the edges of the cast. The dried edges sealed the interior of the cast from additional evaporation of solvent. The dried edges were trimmed off and discarded after polymerization and cooling of the membrane.

These casts were leached with absolute ethanol and heated for twenty hours at 60° C. in a mixture of 25 parts dimethylsulfate and 10 parts absolute ethanol. The quaternized casts were then washed with water and converted to the chloride form by leaching in aqueous normal sodium chloride and rinsing in water.

The resulting membranes had the following properties:

| | |
|---|---|
| Conductivity | $4.5 \times 10^{-3}$ ohm$^{-1}$ cm.$^{-1}$ |
| Capacity | 1.0 milliequivalents per wet gram. |
| Water | 44 per cent by weight. |
| Concentration E. M. F. | 12 millivolts. |

The ion exchange capacity was determined by bringing a specimen of the membrane into equilibrium with a 1.0 N sodium chloride solution, then leaching it repeatedly in distilled water to remove the excess sodium chloride. The specimen was then soaked in a 1.0 N sodium nitrate solution, thereby replacing the chloride ions with nitrate ions and this solution was titrated for removed chloride. The capacity is expressed as the number of milliequivalents of chloride removed by the nitrate per gram of surface dried material.

The electrical conductivity was measured by forming a strip in the leached chloride form 10 cm. long, 1 cm. wide and 0.1 cm. thick, clamping the ends to copper electrodes and measuring the resistance of the strip to 60 cycle alternating current. The conductivity is the reciprocal of the resistance.

The concentration potential was measured in a concentration cell with a specimen of the membrane separating 0.60 N aqueous sodium chloride solution and a 0.30 N aqueous sodium chloride solution. The electrodes were saturated calomel electrodes connected to the sodium chloride solution by means of saturated potassium chloride salt bridges. The membrane was brought into equilibrium with a 0.60 N aqueous sodium chloride solution prior to its insertion in the cell. The respective solutions in the cell were continuously renewed to maintain their concentrations. The value recorded is the absolute value of the open circuit potential after steady conditions were attained. In such a cell, the absolute value of the thermodynamically ideal potential is 17 m. v. It will be seen that this standard was approached.

Having thus disclosed my invention and described in detail the preferred embodiment thereof I claim and desire to secure by Letters Patent:

1. The method of forming infusible, unfractured, and electrically conductvie anion permeable solvated gel structures in the form of membranes of quaternized copolymers of a vinyl pyridine compound of the class consisting of monovinyl pyridine and the alkyl substituted monovinyl pyridines, the alkyl substituents of which are attached to the carbon of the pyridine ring, and a polyvinyl aromatic hydrocarbon, which includes the steps of dissolving the monovinyl pyridine compound and the polyvinyl aromatic hydrocarbon in about 20 to about 70 per cent, by volume on total volume, of a common solvent therefor, disposing the solution to the membrane form, polymerizing the solute to form said copolymer and quaternizing the copolymer, each step being effected under conditions substantially preventive of the escape of solvent to form a solid, coherent, uniform, unfractured gel structure, said solvent being one which is capable of being uniformly and homogeneously occluded in said copolymer.

2. The method of forming infusible, unfractured, and electrically conductive anion permeable solvated gel structures in the form of membranes of quaternized copolymers of a vinyl pyridine compound of the class consisting of monovinyl pyridine and the alkyl substituted monovinyl pyridines, the alkyl substituents of which are attached to the carbon of the pyridine ring, and a polyvinyl aromatic hydrocarbon which includes the steps of dissolving the monovinyl pyridine compound and the polyvinyl aromatic hydrocarbon in about 20 to about 70 per cent, by volume on total volume, of an organic solvent therefor, disposing the solution to the membrane form, polymerizing the solute to form said copolymer and quaternizing the copolymer, each step being effected under conditions substantially preventive of the escape of solvent to form a solid, coherent, uniform, unfractured gel structure, said solvent being one which is capable of being uniformly and homogeneously occluded in said copolymer.

3. The method defined by claim 1 wherein the solution contains about 50% solvent.

4. The method of forming infusible, unfractured, and electrically conductive anion permeable solvated gel structures in the form of membranes of quaternized copolymers of a vinyl pyridine compound of the class consisting of monovinyl pyridine and the alkyl substituted monovinyl pyridines, the alkyl substituents of which are attached to the carbon of the pyridine ring, and a polyvinyl aromatic hydrocarbon which includes the steps of dissolving the monovinyl pyridine compound and the polyvinyl aromatic hydrocarbon in the proportions of 1–3 mols of the vinyl pyridine compound per mol of polyvinyl aromatic hydrocarbon in about 20 to about 70 per cent, by volume on total volume, of an organic solvent therefor, disposing the solution to the membrane form, polymerizing the solute to form said copolymer and quaternizing the copolymer, each step being effected under conditions substantially preventive of the escape of solvent to form a solid, coherent, uniform, unfractured gel structure, said solvent being one which is capable of being uniformity and homogeneously occluded in said copolymer.

5. The method of forming infusible, unfractured, and electrically conductive anion permeable solvated gel structures in the form of membranes of quaternized copolymers of monovinyl pyridine and a polyvinyl aromatic hydrocarbon which includes the steps of dissolving 2-vinyl pyridine and divinyl benzene in the proportions of 1–3 mols of the 2-vinyl pyridine per mol of divinyl benzene in from about 20 to about 70 per cent, by volume on total volume, of an organic solvent, disposing the solution to the membrane form, polymerizing the solute to form said copolymer and quaternizing the copolymer, each step being effected under conditions substantially preventive of the escape of solvent to form a solid, coherent, uniform, unfractured gel structure, said solvent being one which is capable of being uniformly and homogeneously occluded in said copolymer.

6. The method of forming infusible, unfractured, and electrically conductive anion permeable solvated gel structures in the form of membranes of quaternized copolymers of monovinyl pyridine and a polyvinyl aromatic hydrocarbon which includes the steps of dissolving 4-vinyl pyridine and divinyl benzene in the proportions of 1–3 mols of the 4-vinyl pyridine per mol of divinyl benzene in from about 20 to about 70 per cent, by volume on total volume, of an organic solvent, disposing the solution to the membrane form, polymerizing the solute to form said copolymer and quaternizing the copolymer, each step being effected under conditions substantially preventive of the escape of solvent to form a solid, coherent, uniform, unfractured gel structure, said solvent being one which is capable of being uniformly and homogeneously occluded in said copolymer.

7. The method of forming infusible, unfractured, and electrically conductive anion permeable solvated gel structures in the form of membranes of quaternized copolymers of monovinyl pyridine and a polyvinyl aromatic hydrocarbon which includes the steps of dissolving 2-vinyl, 5 ethyl pyridine per mol of divinyl benzene in from about 20 to about 70 per cent, by volume on total volume, of an organic solvent, disposing the solution to the membrane form, polymerizing the solute to form said copolymer and quaternizing the copolymer, each step being effected under conditions substantially preventive of the escape of solvent to form a solid, coherent, uniform, unfractured gel structure, said solvent being one which is capable of being uniformly and homogeneously occluded in said copolymer.

8. As an article of manufacture a solid, infusible, unfractured structure in the form of a membrane comprising a coherent continuum of an insoluble, infusible polymer which is a quaternized copolymer of a vinyl pyridine compound of the class consisting of monovinyl pyridine and the alkyl substitute monovinyl pyridines, the alkyl substituents of which are attached to the carbon of the pyridine ring, and a polyvinyl aromatic hydrocarbon, said polymer being in gel relationship with about 20 to about 70 per cent, by volume on total volume, of a solvating liquid which presents a continuous phase throughout said gel.

9. As an article of manufacture a solid, infusible, unfractured structure in the form of a membrane comprising a coherent continuum of an insoluble, infusible polymer which is a quaternized copolymer of a vinyl pyridine compound of the class consisting of monovinyl pyridine and the alkyl substitute monovinyl pyridines, the alkyl substituents of which are attached to the carbon of the pyridine ring, and a polyvinyl aromatic hydrocarbon in the proportions of 1–3 mols of monovinyl pyridine compound per mol of polyvinyl aromatic hydrocarbon, said polymer being in gel relationship with about 20 to about 70 per cent, by volume on total volume, of a solvating liquid which presents a continuous phase throughout said gel.

10. As an article of manufacture, a solid, infusible, unfractured structure in the form of a membrane comprising a coherent continuum of an insoluble, infusible polymer which is a quaternized copolymer of 2-vinyl pyridine and divinyl benzene in the proportions of 1–3 mols 2-vinyl pyridine per mol of divinyl benzene, said polymer being in gel relationship with about 20 to about 70 per cent, by volume on total volume, of a solvating liquid which presents a continuous phase throughout said gel.

11. As an article of manufacture, a solid, infusible, unfractured structure in the form of a membrane comprising a coherent continuum of an insoluble, infusible polymer which is a quaternized copolymer of 4-vinyl pyridine and divinyl benzene in the proportions of 1–3 mols 4-vinyl pyridine per mol of divinyl benzene, said polymer being in gel relationship with about 20 to about 70 per cent, by volume on total volume, of a solvating liquid which presents a continuous phase throughout said gel.

12. As an article of manufacture, a solid, infusible, unfractured structure in the form of a membrane comprising a coherent continuum of an insoluble, infusible polymer which is a quaternized copolymer of 2-vinyl, 5-ethyl pyridine and divinyl benzene in the proportions of 1–3 mols 2-vinyl, 5-ethyl pyridine per mol of divinyl benzene, said polymer being in gel relationship with about 20 to about 70 per cent, by volume on total volume, of a solvating liquid which presents a continuous phase throughout said gel.

References Cited in the file of this patent

UNITED STATES PATENTS

| Number | Name | Date |
|---|---|---|
| 2,540,984 | Jackson | Feb. 6, 1951 |
| 2,540,985 | Jackson | Feb. 6, 1951 |
| 2,636,851 | Juda | Apr. 28, 1953 |